May 19, 1970     J. H. EDMONDSON     3,512,593
PERSONAL WEIGHT RECORDERS
Filed May 20, 1968     4 Sheets-Sheet 1
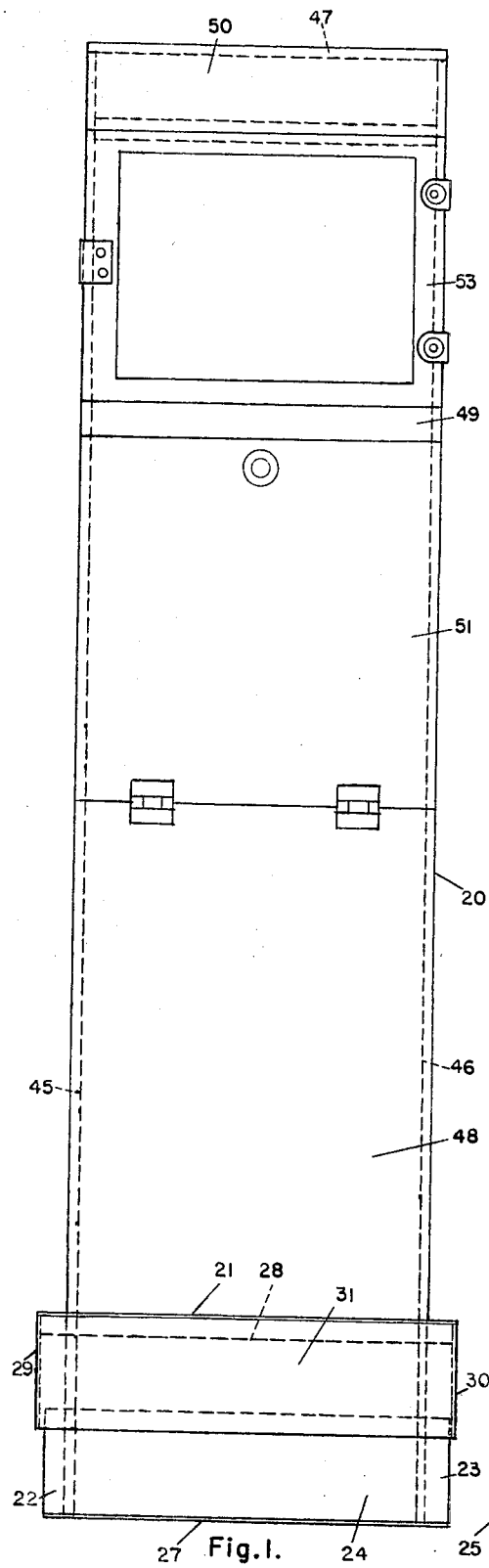
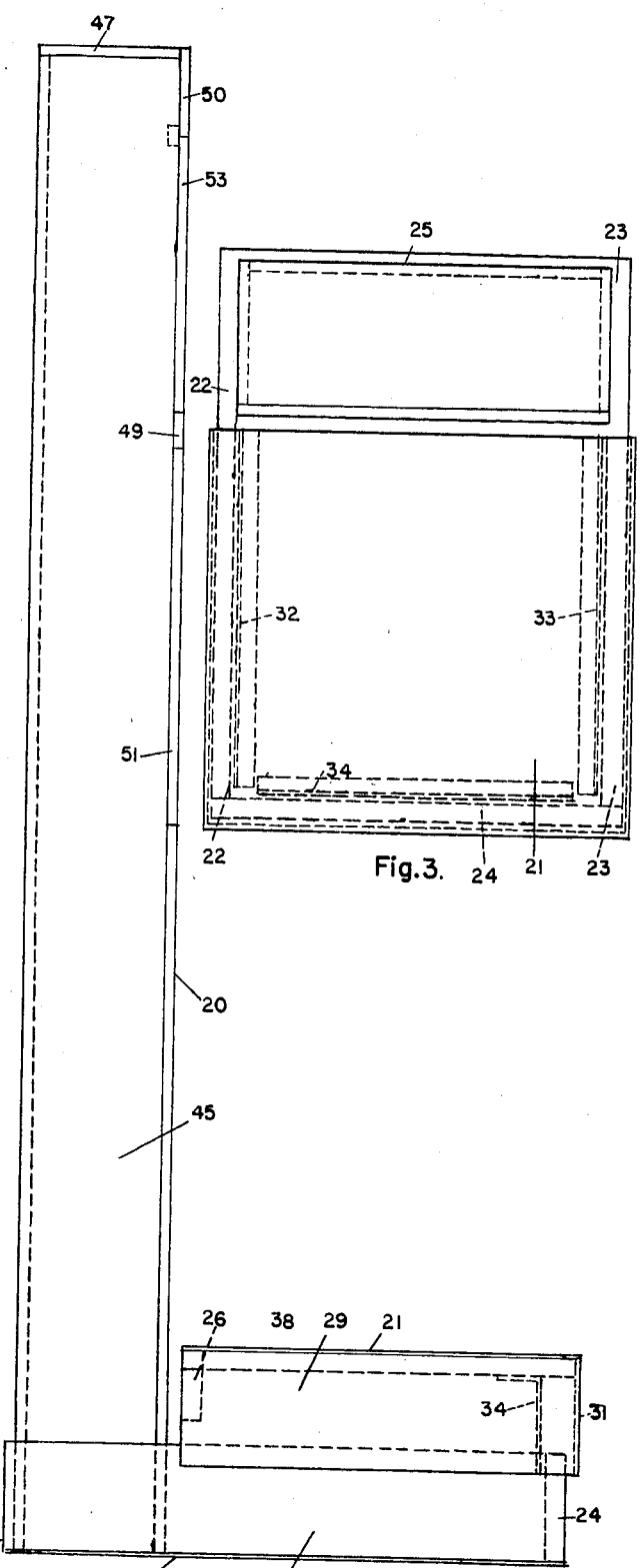
Inventor:
John H. Edmondson,
by Atty.

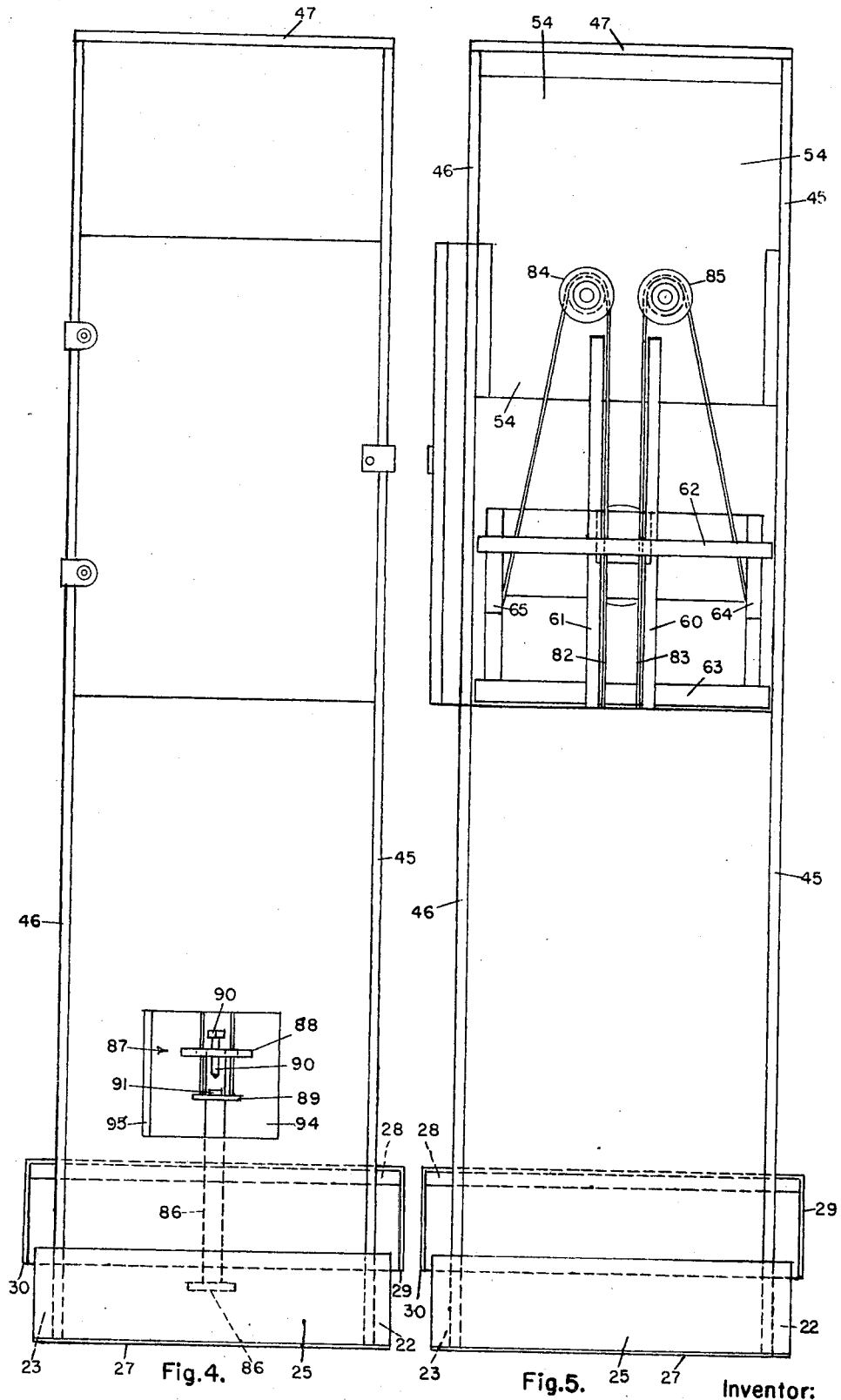

May 19, 1970     J. H. EDMONDSON     3,512,593
PERSONAL WEIGHT RECORDERS

Filed May 20, 1968     4 Sheets-Sheet 3

Inventor:
John H. Edmondson,
by [signature]
Atty.

May 19, 1970  J. H. EDMONDSON  3,512,593

PERSONAL WEIGHT RECORDERS

Filed May 20, 1968  4 Sheets-Sheet 4

Inventor:
John H. Edmondson,
by ... Atty.

3,512,593
PERSONAL WEIGHT RECORDERS
John H. Edmondson, 6333 S. Kimbark Ave.,
Chicago, Ill. 60637
Filed May 20, 1968, Ser. No. 730,332
Int. Cl. G01g 19/40, 23/18
U.S. Cl. 177—5                                          8 Claims

ABSTRACT OF THE DISCLOSURE

A personal weight recorder for producing a record of day to day weights of a person using such recorder; including provision for producing such day to day record over a substantial interval of time such as three months, with provision for simple and ready removal of the record sheet at completion of such time interval, and substitution of a fresh record sheet, and re-setting of the recording stylus to its starting position. The record is produced and is located at position for convenient direct reading by the person standing on the weigh platform. Provision is made for advancing the recording stylus one day spacing along the record sheet at a time, whether or not a record is made for one or more days, thus ensuring that each record produced on the sheet, will be located at the correct daily recording position, as identified by marking on the sheet.

---

The present invention concerns itself with improvements in what I shall call personalized record producing of weights of an individual, day by day, over a considerable interval of time. The presently to be disclosed weighing machine is provided with a conventional platform on which the individual stands, and with means to produce a record of his weight on a record sheet; with provision for advancing the record producing stylus laterally across the sheet, step-by-step, day after day, during a considerable interval of time, such as three months. Accordingly, each day a recording is made of the individual's weight on the day in question. If the individual should allow a day or several days to pass without stepping onto the weigh platform, thus missing a record of weight for such time, the stylus of the recorder is nevertheless advanced each day to correct position for producing a record (but without actually producing such record for such day), so that when next the individual does step onto the platform, a weight record for such particular date is produced. Thus the records of weights are properly synchronized with passage of time, producing a time-weight recording over the time interval covered by such record sheet.

Provision is made for removing a used record sheet at conclusion of the time interval covered by such sheet, and substitution of a new record sheet for the succeeding time interval; and provision is also made for re-setting the stylus carrier laterally to its starting position, ready to produce the succeeding set of recordings over the next time interval.

A simple type of record is one generally known as the bar-type, wherein after each recording is produced, the stylus re-sets back to its base position, with lateral advance of the record sheet, or, as in the present disclosure, lateral advance of the stylus, the record sheet remaining stationary. In producing such bar-type recording, the weight imposed on the platform serves to raise the stylus to a height corresponding to the weight imposed; and after removal of the weight from the platform, the stylus falls back to its base or zero position. The lateral advance of the stylus carrier then brings such stylus to its properly laterally re-set position for the next day's recording operation. Having produced such a bar-type recording, the student thereof may, should he so desire, produce a continuous line extending laterally along the tips of the successive bars, thus facilitating study of the information available from such recording over the time interval in question. Recorders incorporating the features of my present invention are thus of use for home installations, for hospitals, clinics, and numerous other purposes wherein it is desired to integrate time with weight. Thus, weighing machines embodying features of my present invention are useful in studying the progress of a weight-reducing diet, or the recovery of a patient from a serious illness, measured by his progress in weight recovery, or conversely, the advance of a disease, measured by the progress in loss of weight; and many other useful purposes available from the use of machines embodying features of my present invention, will suggest themselves.

More specifically, it is an object of the present invention to provide for producing a lineal variation of the stylus movement with equal variations of imposed weight. Such objective is served by provision of a conventional platform on which the patient stands during the weighing operation, together with means to ensure that the desired lineality of recording shall be produced, regardless of the exact part of the platform supporting his weight. To this end I have provided a spring supported platform without pre-loading of the springs, so that the graph between loading and variation of strain, shall be linear, with the intersect extending through the zero position between the ordinates and the abscissae of a characteristic curve of such arrangement. I have also provided an arrangement wherein the displacement of the connection between the platform and the movement transmitting element to the stylus, shall always indicate correctly the imposed load, no matter which part of the platform may carry the imposed load. Thus, whether the patient stands on the center of the platform, or forwardly or backwardly of such center, or to one side or the other of the platform, the displacement of the connection between the platform and the stylus, shall be a true indication of the supported load, measured on a linear scale. The details of this arrangement will appear hereinafter.

It is a further object of the invention to provide a simple, directly operating, and rugged structure, constituted to produce records of dependable accuracy, and of construction not liable to damage by sudden violent depressions of the platform, such as may occur by customary stepping onto such platform for the weighing operation.

Other objects and uses of the invention will appear from a detailed description of the same, which consists in the features of construction and combinations of parts hereinafter described and claimed.

In the drawings:

FIG. 1 shows a front view of the weighing machine, both of the front doors being closed, and the platform being in its normal or raised position, occupied when no weight is imposed on such platform;

FIG. 2 shows a left-hand elevational view corresponding to FIG. 1;

FIG. 3 shows a plan view corresponding to FIGS. 1 and 2;

FIG. 4 shows a back or rear view corresponding to FIGS. 1 and 2;

FIG. 5 shows a view corresponding to FIG. 4, but with the back side door opened to show some of the interior structures;

Figure 6:
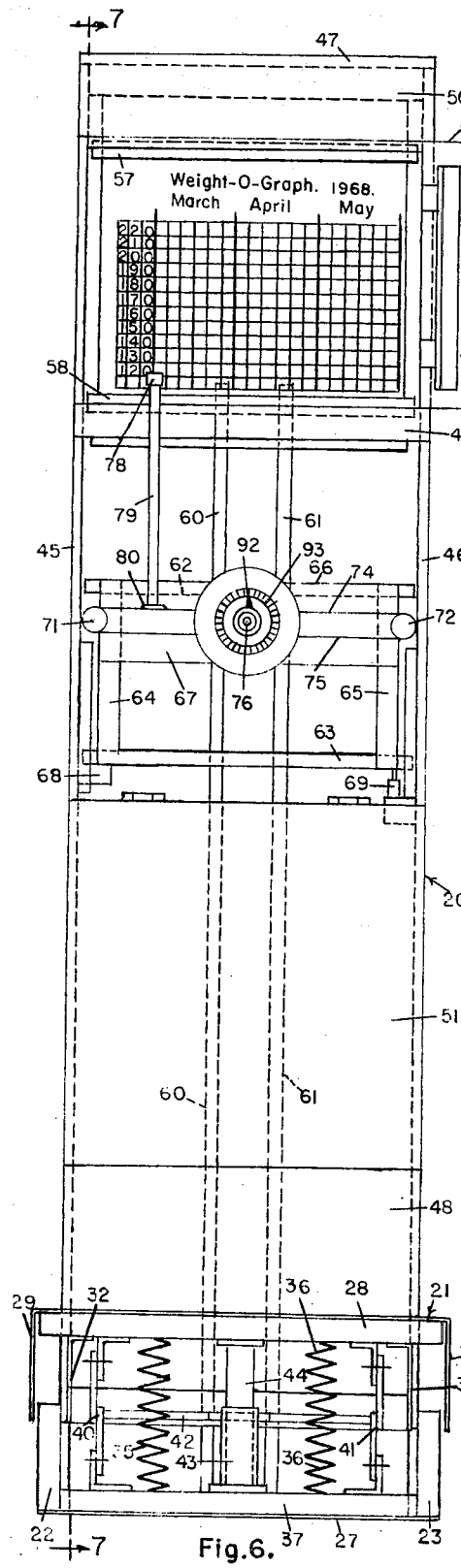
Figure 7:
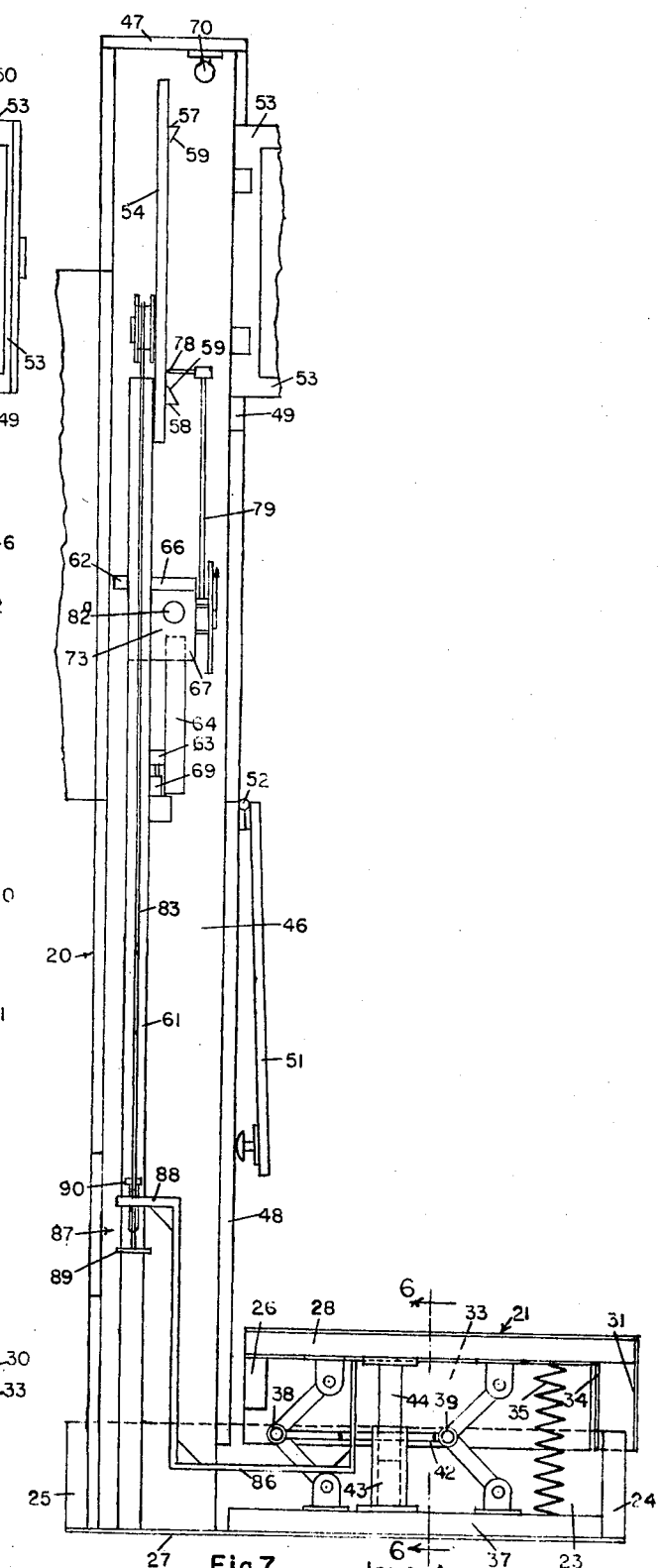
Figure 9:
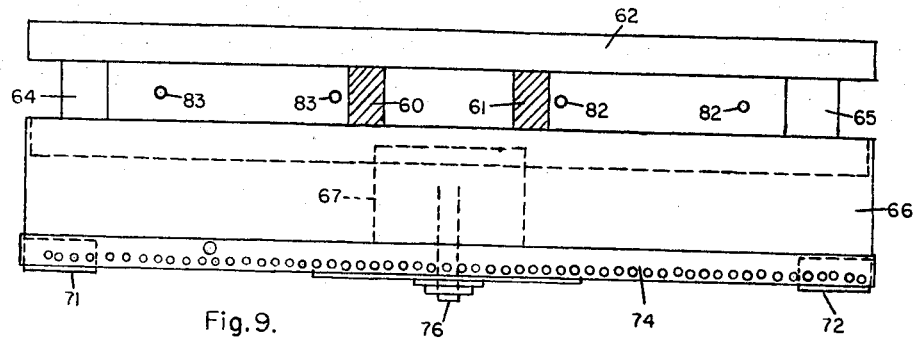
Figure 8:
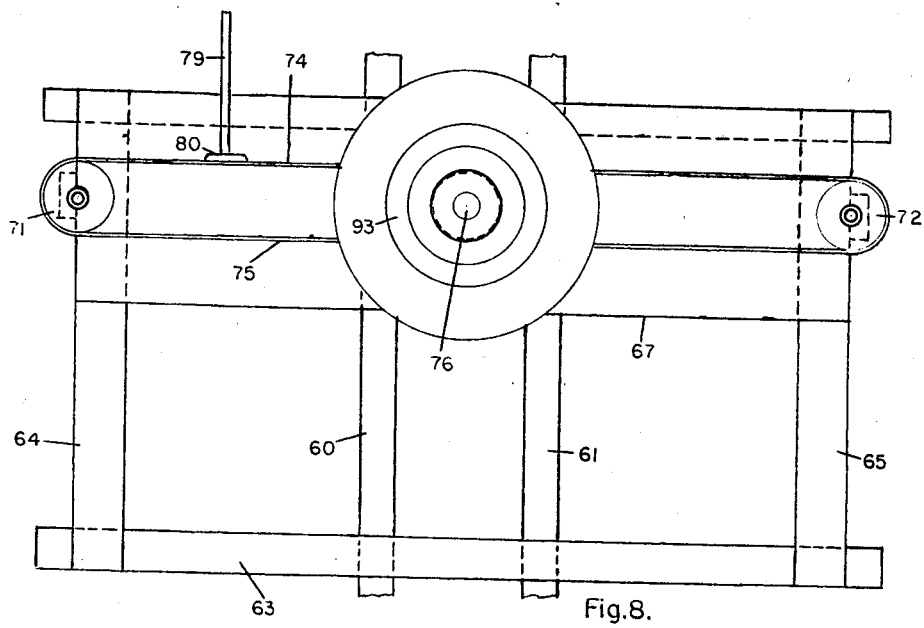

FIG. 6 shows a front view corresponding to FIG. 1, but with the upper and lower front doors opened; the former showing the record sheet in place supported by the record carrier, and also showing the stylus in its lowered or zero position, and at its left-hand moved position, being its starting position for producing a record day by day stepping rightwardly towards the right; and in this figure the platform structure is shown in section according to an irregular section taken on the line 6—6 of FIG. 7, looking in the direction of the arrows;

FIG. 7 shows a vertical central section through the entire machine, being a section taken substantially on the line 7—7 of FIG. 6, looking in the direction of the arrows;

FIG. 8 shows a fragmentary front face view of the time counting element by which the stylus carrier is advanced laterally to the right for location day by day in positions correct for producing the bar type records corresponding to the weights imposed during weighing tests produced on such days; this figure being on larger scale than FIGS. 1 and 6;

FIG. 9 shows a fragmentary plan view corresponding to FIG. 8; and

Figure 10:
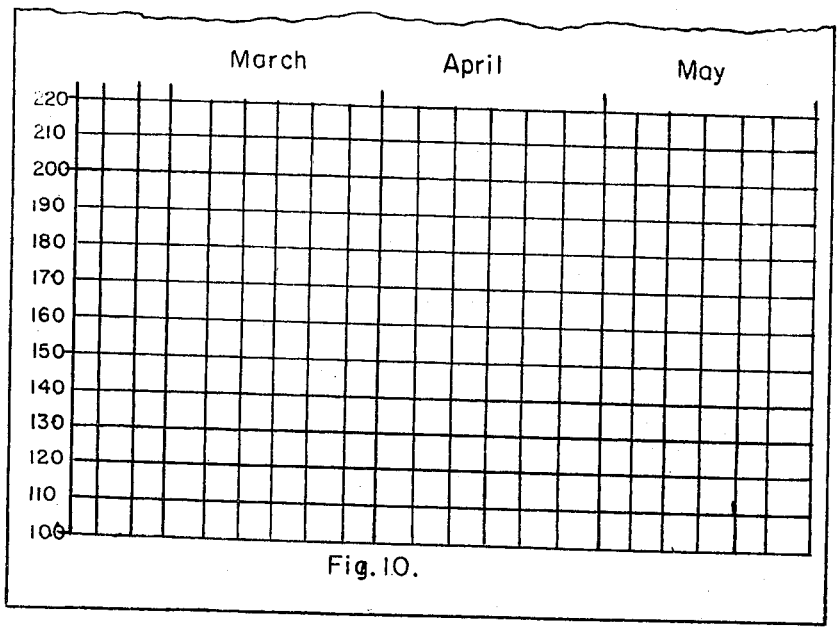

FIG. 10 shows a face view of a typical chart for use in connection with the machine of the present invention, removed from such weighing machine, being on enlarged scale as compared with FIG. 6.

Referring to the drawings, the weighing machine includes the vertical section 20 and the horizontal, platform section 21, connected to the lower end of such vertical section 20. Conveniently the platform section comprises the side bars 22 and 23 having their front ends connected to the front bar 24 in rigid manner. Such side bars extend rearwardly far enough to embrace the lower end of the vertical section, as shown in FIGS. 1, 2 and 3 in particular. A rear cross bar 25 connects the rear ends of such side bars together, thus producing a rigid rectangular base frame. If desired a cross piece 26 may be extended between the side bars 22 and 23 just in advance of the lower end of the vertical section 20, but set above the bottom face of the platform section, to enable necessary connections between the platform and vertical sections, hereinafter to be described. The bottom face of the platform section is closed by a sheet metal plate 27. The upper portion of such platform frame remains open, the vertically movable platform 21 being located above, and telescoping around such platform frame section. Thus such platform section 21 includes the stiff sheet 28 extending between the side angles of sheet metal 29 and 30 which depend from such sheet 28, and the front angle 31 which extends down from such sheet 28. All three of such downwardly extending angle members 29, 30 and 31 are set out far enough to slightly clear the outer perimeters of the frame member 22, 23 and 24, and such angles also depend slightly lower than the upper edges of such frame members, as shown in FIGS. 6 and 7 in particular. Thus a telescoping arrangement is produced, wherein the platform proper may be depressed sufficiently to balance the greatest load to which the weighing machine is intended to receive. If desired, the downwardly extending angles 32 and 33 may be provided along the side portions of the sheet 28, extending down proximate to the inner faces of the platform frame bars 22 and 23, respectively, but spaced therefrom sufficiently to avoid interference with the up and down movements of the platform proper. Likewise, another downwardly extending angle 34 may be secured to the plate 28, extending down therefrom just behind the front platform frame bar 24, and clearing the same sufficiently to avoid interference with the free up and down platform movements. All such downwardly extending angle elements which are connected to the platform sheet 28, serve to prevent excessive lateral and front to back movements of the platform proper with respect to the platform frame; but such lateral and such front to back movements of the platform proper are also controlled by the elbow units and connections presently to be described, and which will normally retain the platform against lateral sway or front to back shift within a very small tolerance. It is also noted that such elbow units serve to ensure up and down movements of the platform proper without lateral or front to back shift of such platform unit, for purposes of ensuring accurate weight measurements, and transmittal of such measurements linearly to the stylus operating elements, as will hereinafter appear.

The springs 35 and 36 are secured to the bottom plate 37 of the platform frame, the side bars 22 and 23, and the bottom sheet 27 being connected to such bottom sheet. Thus the lower ends of the springs are rigidly retained against movement with respect to the platform frame in particular. The upper ends of such springs just reach to the under face of the sheet 28, being attached thereto in manner to prevent side-wise or lateral shift of such upper spring ends. Such springs are not loaded when no load is carried by the platform, so the springs will be deformed according to a linear deformation under varying platform loadings. Two elbows are located between each side of the platform and the sheet 37 directly below, these being the elbows 38 and 39 at the left-hand side of platform, and 40 and 41 at the right-hand side of the platform. Each such elbow comprising the two links $a$ and $b$ pivotally connected together, and with their upper and lower ends pivotally connected to brackets secured to the platform plate 28 and to the base plate 37, respectively. All such links are of the same length (measured between their two pivotal connections). Accordingly, when the pivotal point of the links $a$ and $b$ of one elbow 38 is connected by a link to the pivotal point of the links $a$ and $b$ of the elbow 39, provided that the length of such so interconnecting link is the same as the distance between the brackets to which the links $a$ of the one elbow 38 and the other elbow 39, are connected to the platform, and also the same as the distance between the brackets by which the links $b$ of such elbow 38 and the other elbow 39, are connected to the base plate, the platform above such two pairs of links, or elbows, must rise and fall while retaining the platform always parallel to itself. A similar reasoning must also apply respecting the two elbows 40 and 41 at the other side of the platform. By making the interconnecting links between the elbows 40 and 41 the same in length as such aforesaid link between the elbows 38 and 39, both sides of the platform must rise and fall while remaining parallel to such platform and parallel to the base plate. By integrating the interconnections of both pairs of elbows (38–39, and 40–41), both sides of the platform must always rise and fall parallel to the base plate, the vertical movements of the platform always occuring while the platform remains parallel to itsef. That is, all vertical movements of the platform will occur under the condition that such platform always remains parallel to a common and unvarying plane. Such integration of the two interconnections is produced by providing the plate 42 having its corners pivotally connected to the four elbows at their link interconnected ends, such plate 42 being of rectangular form. With this or corresponding structure, any load applied to any portion of the area of the plaform will cause such platform to descend with its surface always parallel to itself, and always parallel to the base plate 37. Thus, when the patient steps onto the platform the depression of all of the springs 35 and 36 will be equalized, and such depression will be linear in amount, that is, equal spring compressions will be produced by equal increments of the loading. Accordingly, a direct connection between the platform and the stylus, presently to be described, will produce equal increments of stylus movement during recording.

It is now noted that lateral forces exerted against the platform will be resisted by the pivotal connections to the corners of the plate 42, tending to bend such pivotally connected corners. A small degree of such lateral force would probably not produce such bend; but to insure against such possibility, and to ensure protection of the parts against such lateral force, I have made the following provision;

I have provided the cylinder 43 extending upwardly from the central portion of the base plate 37 and secured thereto, together with a companion plunger element 44 secured to the under face of the platform sheet 28 and extending into and working in such cylinder with a nice fit. The cylinder and the plunger are proportioned so that a substantial length of the plunger will always be telescoped into the cylinder, sufficient to resist lateral deformation, and thus to protect the plate 42 against the distortion already refererd to. Additionally, the sheets 29 and 30, and 32 and 33, and 31 and 34 which depend from the platform in telescoping manner with respect to the base frame elements, may be designed and located at small clearances from such base frame elements, to thus come into engagement therewith, by small deflections produced by relatively small lateral forces. Additionally, the telescoping of such elements with the base plate frame elements will protect against entrance of foreign materials into and between the relatively movable elements of the platform structure.

The vertically extending portion 20, of the machine, reaches up from the rearwardly extending base elements 22 and 23, together with the cross-wise extending element 24, already referred to. Accordingly, such portion 20 is firmly connected to the weighing platform structure.

Such vertically extending portion includes the side plates 45 and 46, together with the front and back panels and the top element 47. The front panel or enclosure includes the lower panel 48 which extends up to a large opening defined by the top edge of such lower panel and a cross-wise extending bar 49; and a viewing opening is defined by such bar 49 and the lower edge of a top panel 50. The first mentioned opening is provided with the hinged door 51, hinged to the top edge of the panel 48 by a piano type hinge 52 in conventional manner. Such door 51 may thus be raised into closed position and locked in convenient manner. The viewing opening is provided with a side edge hinge or hinges carried door 53, and suitable locking facilities are provided for locking such door when closed. Such door is provided with a large window, preferably of glass, through which the whole area of the chart undergoing recording, as well as the upper portion of the stylus carrier, may be viewed without need of opening the door. As successive days pass the stylus advances rightwardly by the structures presently to be described. The chart shown in FIG. 6 is typical of charts which may receive the desired recordings. One such chart is also shown enlarged in FIG. 10. Such chart may be provided with light ordinal lines defining calendar intervals, such as successive days, or as shown in FIGS. 6 and 10, defining successive five day intervals, since the scales to which such figures are drawn make it inconvenient to show successive days. Furthermore, the defining of such canendar intervals by ordinal lines should be of such fine or semi-transparent character as not to obscure or even materially reduce the emphasis of the recorded bar produced on such line. The manner in which the stylus is advanced rightwardly with passage of time, will be disclosed presently.

The illustrated chart also includes abscissa lines extending across the chart at sucessively higher positions. These lines indicate weights; and the height of the bar record at any give date or time interval, may thus be immediately determined by the height of the bar corresponding to such calendar time. It is noted that in the illustrated chart the lowest weight indication is for 120 pounds, and the stylus illustrated in such figure stands at such low weight position. Since the stylus movement related to weight impressed on the platform is linear, it is evident that for the condition of no weight on the platform, the stylus should, in the absence of special provision, be much below such 120 pound indication. Accordingly, I have, in the structures presently to be described, made provision for a lost-motion between the directly platform connected element, and the element connecting to the stylus, enabling platform movements of less than 120 pounds weight indication, to occur freely without causing stylus rise; and such lost-motion connection produces force transfer from the platform to the stylus, only when a load of 120 pounds or more is carried by the platform. Evidently, some other lost-motion amount, either more or less than 120 pounds may be provided for. It is also noted that by thus eliminating recording of weights less than a prescribed value, the space available for producing records on the chart may be used either for recording to higher values under a specified detail of recorded bars, or for recording to a given high value, at prescribed higher detail of the recordings.

The chart is readily insertable in place or removed therefrom as follows:

A plate 54 is extended across the upper portion of the structure between the side panels 45 and 56 of the element 20. The front face of such plate 54 is provided with top and bottom chart receiving and supporting clamps 57 and 58, respectively. These clamps may be of conventional form, comprising the spring pressed strips 59 which press the edge portion of the chart carrying paper or card against the front surface of such plate 54 in conventional manner. With such structure the chart is readily inserted into or removed from the plate; and by properly sizing the spacing between the two clips, vertical adjustments of the chart to exact vertical calibration for correct weight recordings, may be produced. Lateral adjustments of the chart may also be produced to ensure correct calendar readings for the several bar-type records to be made by the stylus.

Two vertical bars 60 and 61 are extended from such plate 54 to the bottom of the structure, and are secured to such plate 54 and to the bottom of the structure. These bars afford guidance for the stylus carrier during up and down movements of such carrier, as will be presently explained.

The stylus carrier comprises a light frame including the top and bottom bars 62 and 63, respectively, together with the vertical struts 64 and 65 to which such top and bottom bars are connected. Examination of FIG. 7 in particular shows that the top bar 62 rides against the back surfaces of the two vertical bars 60 and 61, whereas the bottom bar 63 rides against the front surfaces of such vertical bars. Thus torques produced by the weight of the frame and connected elements, tending to rock such frame clockwise, viewed as in FIG. 7, are properly taken up. Additionally, a top board 66 is provided in such frame, such top board riding against the front surfaces of the bars 60 and 61. A box-like element 67 is secured to and comprises a portion of the frame in front of the bars 60 and 61. This box-like element encloses a time counting unit, such as an electric synchronous motor unit, to be referred to hereinafter.

A stop element 68 is secured to the left-hand plate 45 in position to limit the downward movement of the frame at a zero or base position, wherein the stylus is engaged with the chart surface at its low weight position (as shown in FIG. 6 such low weight position is the 120 pounds recording position). Secured to the opposite side panel 56 below the frame is a switch, such as a microswitch 69, having its actuating pin extending upwardly into position for engagement by the frame just prior to stoppage of the downward movement of the frame, produced by the stop 68. Such switch has its contacts biased to close circuit just as the frame rises during a recording operation. Normally, when the frame is in its fully lowered position such switch is open circuited. Such switch is connected to a conventional service outlet for current; and a lamp 70 is secured to the top plate 47 of the structure, being connected to such current outlet through the microswitch. Accordingly, such lamp is normally un-lighted while the frame is in its fully lowered position; but as soon as the frame rises slightly by weighing force transmitted from the platform, the microswitch closes, thus lighting the lamp, and illuminating the front surface of the chart. Such illumination continues during the interval of weighing, but ceases as soon as the weight is removed from the platform.

It remains to describe the means which I have provided for advancing the stylus laterally of the chart at a rate to shift from position proper to produce the record-bar for one day weighing, to position proper for producing the recording for the following day. This is a slow lateral travel, and is conveniently produced by a small synchronous motor driven gear-train enclosed in the box-like unit 67, and continuously supplied with conventional A.C. 60 cycle supply. The gear-train is such as to produce lateral travel of the stylus only from one bar-like recording position to the next, during the interval between recordings, assume as 24 hours. In the chart showings of FIGS. 6 and 10, provision is made for ninety days of recordings. Accordingly, the stylus should travel the full width of the chart during a ninety day interval.

Reference is next made to FIGS. 6, 7 and 10 showing the lateral drive means for travelling the stylus from ordinal position to ordinal position, laterally, already referred to. This structure includes the synchronous motor drive, of more or less conventional form, geared to produce the desired slow lateral travel rightwardly, of the stylus. It is unnecessary to describe such unit in detail since various small synchronous motor driven, geared-down units are well known in the arts. The small pinions 71 and 72 are journalled to the unit 67 at the sides of the structure, being separated a distance sufficient to accommodate the needed travel of the stylus carrier. A thin flexible metal tape (e.g., of steel), in the form of a loop is extended over such pinions, thus providing the straight runs 74 and 75. The output shaft 76 of the gear reduction train carries a small toothed wheel 77 which engages corresponding sprocket tooth openings along one edge of the tape loop, it being noted that since the tape runs travel in opposite directions both runs of the tape may be drivingly engaged by the toothed wheel.

The stylus 78 is carried by a vertical stem 79 whose lower end is secured to the tape run in manner such as to prevent deflection of such stem laterally, so that it retains its verticality during the entire lateral travel needed to produce recordings for the total time interval intended. For this purpose the stem 79 is shown as connected to a small base plate 80 firmly secured to the top run of the tape.

Since the lateral travel of the stylus carrier is limited it is desirable to provide means to cut off the current supply to the synchronous motor at the right-hand end of the permissible travel. The microswitch 81 mounted to a stationary part adjacent to the extreme rightward travel of the stylus carrier, is engaged by the stylus carrier or some element carried by the tape, at completion of such rightward travel of the top run of the tape, thus cutting off current supply to the motor. If desired such switch may be of that type wherein one depression of a contact controlling element serves to open the switch, and the succeeding depression of such element serves to close the contacts; it being noted that after stoppage of the motor drive, it is necessary to return the sylus carrier leftwardly to its starting position, preparatory to a succeeding series of recording operations. A re-setting button 82$^a$ is shown in FIGS. 7 and 10, at the location of the motor. This button when activated, serves to re-set the output shaft of the motor's gear train backwardly, to cause the toothed wheel to drive the tape in reverse direction, necessary for such re-setting. During such re-setting the microswitch 81 remains open-circuited. When the recorded chart has been removed and a fresh chart has been set into place, and properly adjusted laterally and vertically to cause the stylus (now at its lowered position) to register with the starting day to day ordinal line, and the low weight position of the chart, the microswitch may be reversed to closed circuit position, thus starting another thirty day or three month series of recordings.

The stylus frame is movable upwardly from its lowest position (stopped in downward movement by the stop block 68, see FIG. 6) when the weight on the platform exceeds the minimum for which the record chart is intended. Such upward movement of the stylus is produced by raising the stylus carrier frame when the weight imposed on the platform exceeds such chart minimum record value. For producing such operation I have provided the two cords 82 and 83 connected to the vertical frame bars 64 and 65 (see FIG. 5), which cords are carried up and over the pulleys 84 and 85 journalled to the rear face of the plate 54, and then down between the vertical bars 60 and 61 to a point of connection with the bar 86 which extends rearwardly from the platform, and beneath the vertical machine section 20. The connection between the cords 82 and 83, and the bar 86 may be a direct connection, or, as shown in detail in FIGS. 4 and 7, it may include a lost-motion unit for the purpose explained below:

When the connection between such cords and the bar 86 is a direct connection, it is evident that as soon as weight is imposed on the platform, the stylus carrier and stylus will start to rise from a base or zero weight position. Accordingly, such a direct connection arrangement may be suitable when the markings on the chart start at zero weight, corresponding to the fully lowered position of the stylus, and when the weight markings on the chart increase in direct linear ratio as the imposed weights increase by equal increments. But it is evident that, if it be desired to provide an arrangement in which the fully lowered position of the stylus corresponds to some definite weight (shown on the illustrated chart as "120"), then impositions of weights less than such selected minimum (e.g., 120) must not cause rise of the stylus from its base position. Furthermore, the arrangement must be such that as weights greater than such minimum are imposed on the platform, the stylus will be driven upwardly by equal increments of upward movement, corresponding to equal increments of imposed weight, greater than the selected minimum. Such an arrangement is desirable from several standpoints. For a vertical dimension of available chart, and for vertical advances of the stylus corresponding to successive equal increments of weight, it is evident that only a limited number of such increments may be accommodated in such available vertical dimension, allowing satisfactory sized spaces between the increments—that is, for production of a satisfactory detail of the readings of weights greater than such minimum weight. When the machine is intended for weighing imposed weights more than relatively small ones (e.g., not over 100 pounds), and with a chart height of, say five inches, the spacings between successive weight increments of 5 pounds may be 1/20 of five inches, or 1/4 inch. With such a scale spacing, and for recording weights of, say 200 pounds, and starting chart recordings at zero weight, and with recording of weight increments of 5 pounds as before, need would exist for accommodation of 40 recordings of 5 pounds each; and when retaining the same vertical dimension of the chart (5 inches), it is evident that the successive recordings would be 1/8 inch apart, being one-half of the spacings available when the upper limit of weight was 100 pounds. Such a small spacing between successive weight increments, might be found unsatisfactory.

Following the foregoing analysis, if the device be such that no stylus movement will occur from its fully lowered position until a minimum recordable weight of 100 pounds be imposed on the platform, then the still available recording space being 5 inches, it will now be necessary to produce only 20 recordings of 5 pounds each between 100 pounds and 200 pounds, and it will now be possible to obtain the original detail of 1/4 inch between successive five pounds increments, over the differential between 100 pounds and 200 pounds. Thus, by making provision for starting at pre-determined minimum recorded weights, it becomes possible to chart record weight above such minimum, and up to a desired maximum, within a chart height much less than otherwise would be needed, and without sacrifice of detail. The presently disclosed structures make such provision, which will now be described.

Referring to FIGS. 4 and 7 I have provided a lost-motion unit 87 between the bar 86 and the cords 82 and 83, such that as the bar 86 is lowered by imposition of increasing weight on the platform, drive of the cords downward (for rise of the stylus carrier) will not commence until such lost-motion has been taken up. Such lost-motion unit includes as an extension 88 of the bar 86, extending across the lines of the two cords 82 and 83, such cords then being connected to a plate 89 below the extension 88. For this purpose the extension 88 is provided with holes through which the cords are passed, to the plate 89. This arrangement will prevent shift of the plate 89 from proper alignment with the extension 88, which alignment is needed to produce adjustment of the lost-motion, as will now appear.

A screw 90 is threaded through the extension 88 and may be adjusted to bring its lower end an adjusted distance from the plate 89. Conveniently such plate 89 is provided with a recessed anvil 91 to receive and exactly center the screw as it descends (under increased weight imposed on the platform), thus ensuring that driving engagement will occur from the screw to the plate 89 at an exactly determined descent of the platform, corresponding to a pre-determined imposed weight. Thus, start of rise of the stylus with increasing imposed weight will occur at the base or lower weight marked position of the chart. If desired the screw may be provided with markings designating imposed weights at which stylus rise will begin, for the following reason, among others.

I contemplate the use of charts scaled and marked for various ranges of weights to be recorded thereon, and all such charts being marked with weight recordings spaced at equal values of detail. For example, if the detail be selected as such that between low and high readings on various chart forms, the recorded weights of minimum and maximum be sixty pounds, with marked weights five pounds apart, it will be evident that twelve such recording marks may be accommodated within the assumed recording height of five inches, each such mark designating an increase of five pounds weight over the marking for the next lower marked position. On this basis, various charts may be produced, each being provided with a vertical recording space of five inches height, provided with twelve increments, each of five pounds. A series of such charts might be as follows.

Chart form:                             Pounds
A _____   0–60
B _____  60–120
C _____ 120–180
D _____ 180–240
E _____ 240–300
F _____ 300–360
G _____ 360–420
H _____ 420–480

By properly setting the adjustable lost-motion unit for commencement of weight recording at the low point of the chart to be used, the recordings produced on such chart will be of the same detail as recordings produced for other selected charts and corresponding weight ranges.

It will be noted that each of the chart forms suggested in the foregoing tabulation is of the same overall vertical recording space as each of the other chart forms. Accordingly, any selected form may be set into and clamped in place on the plate 54, and adjusted vertically, to bring its low reading chart marking to exact registry with the stylus when such stylus is at its low or starting position, determined by the stop block 68 (FIG. 1). Then, having adjusted the lost-motion unit 87 to take-up at the low recording position of such selected chart, the stylus record will commence at the low weight position shown on such chart. Such adjustment of the lost-motion unit may be, as previously suggested, by provision of suitable comparison marks, or by empirical test.

The chart illustrated in the drawings shows three month areas. It is intended that vertical ordinal lines shall be provided corresponding to each day (or, in case of excessive crowding by such daily ordinal markings), each group of several days (e.g., five), with calibration of the motor drive at such rate that during each 24 hours the stylus shall advance the proper distance corresponding to such single day (or such group of days). Accordingly, the ruling of each chart for a given month may be inclusive of either thirty or 31 ordinal lines (or 28 for February), thus exactly coordinating each monthly chart with the proper number of days recorded, and with the recording for each day being correctly indicated on the ordinal line for such specific day.

If desired a pointer 92 (see FIG. 6), may be connected to the output shaft of the gear reduction element through which the lateral travel of the stylus carrier is produced. When the gear drive to the tape 74–75 is such that one rotation of the shaft 70 corresponds to a specified number of days (e.g., 30), the pointer 72 may be read on a circular scale, to show the day of the month currently being recorded, the scale 93 being properly calibrated for this purpose.

Referring again to the lost-motion unit, the provision of the vertical section of the bar 86 serves to raise the lost-motion unit to a height corresponding to such vertical section. I have provided the opening 94 in the rear wall of the vertical section 20 of the machine, such door giving access to the lost-motion unit for convenient adjustment of such lost-motion, corresponding to the positioning of the stylus carrier at the proper starting position, according to the starting weight to be recorded on the chart. A door 95 may be provided for protection of such adjusted position, against tampering by unauthorized persons.

I claim:

1. A weighing machine comprising in combination; means to support a chart sheet carrying ordinal lineations corresponding to progressively higher weight showings, which ordinal lineations are located at progressively spaced abcissa locations corresponding to equal timing positions across the chart; together with a stylus carrier proximate to such chart, means to advance said stylus carrier laterally across the chart sheet from ordinal line position to ordinal line position at equal time intervals, a stylus carried by the stylus carrier and in marking engagement with the chart sheet; a weighing platform, spring means to sustain said platform at a non-load position, and constituted to permit depression of the platform with progressively greater loadings carried by the platform; and connections between the platform and the stylus carrier, constituted to raise the stylus carrier to progressively higher positions corresponding to progressively greater platform loadings, with movement of the stylus to progressively higher positions on the chart and production of bar-type recordings on the chart at ordinal positions of the chart corresponding to the laterally moved positions of the stylus carrier, and with return of the stylus to its base position when the platform is unloaded.

2. A weighing machine as defined in claim 1; together with a lost-motion unit comprising a portion of the connections which are between the platform and the stylus carrier, constituted to permit lowering of the platform under a pre-determined base weight on the platform and non-movement of the stylus carrier during such platform movement, and with recording movement of the stylus during platform lowering under weight greater than such base weight.

3. A weighing machine as defined in claim 2; wherein the lost-motion unit includes adjustable means constituted to vary the amount of lost-motion in the connections which are between the platform and the stylus carrier, with corresponding change of the base weight at which the stylus commences recording, and corresponding change of the range of platform weights recorded by the stylus.

4. A weighing machine as defined in claim 2; wherein the lost-motion is adjustable to different amounts of lost-motion, corresponding to different base weights at which the stylus commences recording operations.

5. A weighing machine as defined in claim 4; wherein the chart supporting means includes means to removably support a selected one of a series of different charts, corresponding to different adjustments of the lost-motion of the lost-motion unit.

6. A weighing machine as defined in claim 5; wherein each chart of such series of charts includes a low-reading indicia corresponding to a permitted weight loading of the platform with non-movement of the stylus carrier in recording direction.

7. A weighing machine as defined in claim 2; wherein the differential between weight-recording movements of the stylus carrier and increments of weight-recorded movements of the platform, is linear.

8. A weighing machine as defined in claim 6; wherein the low-reading weight indicia of each chart of the series corresponds to a permitted weight-loading of the platform with non-movement of the stylus carrier corresponding to an adjustment of the lost-motion unit.

References Cited

UNITED STATES PATENTS 3,154,159  10/1964  Gardner et al. _____ 177—10

FOREIGN PATENTS 244,876  7/1947  Switzerland.

ROBERT S. WARD, Jr., Primary Examiner

U.S. Cl. X.R.

177—10, 245